United States Patent [19]

Kojima

[11] Patent Number: 4,644,477

[45] Date of Patent: Feb. 17, 1987

[54] PRINTING APPARATUS

[75] Inventor: Yasumichi Kojima, Chiryu, Japan

[73] Assignee: Brother Industries, Ltd., Nagoya, Japan

[21] Appl. No.: 632,632

[22] Filed: Jul. 19, 1984

[30] Foreign Application Priority Data

Aug. 31, 1983 [JP] Japan .............................. 58-161037

[51] Int. Cl.[4] ......................... B41J 1/22; G06F 15/62

[52] U.S. Cl. ................................ 364/523; 101/93.03; 101/93.18; 101/93.19; 364/519; 400/144.2

[58] Field of Search ............... 101/93.03, 93.18, 93.19; 364/519, 523; 400/144.2

[56] References Cited

U.S. PATENT DOCUMENTS

| | | | |
|---|---|---|---|
| 4,091,911 | 5/1978 | Chang et al. | 364/519 X |
| 4,138,719 | 2/1979 | Swanstrom et al. | 364/200 |
| 4,189,246 | 2/1980 | Kane et al. | 400/144.2 |
| 4,217,055 | 8/1980 | Moon | 400/144.2 |
| 4,541,746 | 9/1985 | Bobart et al. | 400/144.2 |

*Primary Examiner*—Errol A. Krass

*Assistant Examiner*—Edward R. Cosimano

*Attorney, Agent, or Firm*—Kane, Dalsimer, Kane, Sullivan and Kurucz

[57] ABSTRACT

A printing apparatus having a first memory which stores as one unit 8-bit data comprising first data of 6 bits and second data of 2 bits, the first data comprising position data which correspond respectively to printing types formed on the circumference of a rotary printing wheel and which are divided into plural groups, the position data being different from one another in each of the groups and including data common to the groups, the second data being indicative of the urging strength of each printing type when urged against the printing medium; a second memory which stores data for distinguishing between groups to which externally provided character data belong, the second memory storing such distinguishing data for each printing type; and an 8-bit CPU which, in accordance with an externally provided character data, reads out position data and impact data corresponding to that character data from the above first and second memories.

4 Claims, 6 Drawing Figures

FIG. 2
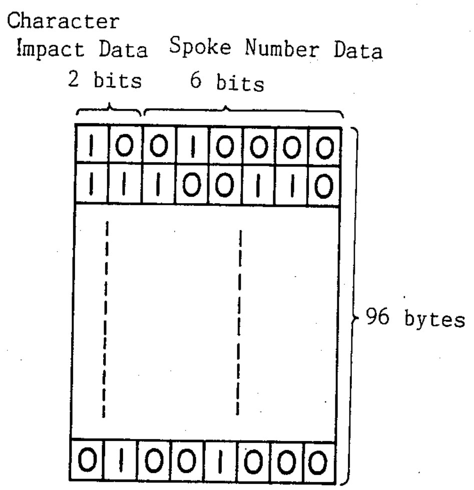
FIG. 4
| $I_S$ \ $I_C$ | 3 | 2 | 1 | 0 |
|---|---|---|---|---|
| H | $I_{3H}$ | $I_{2H}$ | $I_{1H}$ | $I_{0H}$ |
| M | $I_{3M}$ | $I_{2M}$ | $I_{1M}$ | $I_{0M}$ |
| L | $I_{3L}$ | $I_{2L}$ | $I_{1L}$ | $I_{0L}$ |
FIG. 3
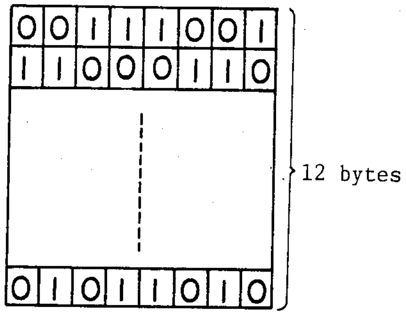

PRINTING APPARATUS

BACKGROUND OF THE INVENTION

The present invention relates to a printing apparatus for printing characters by urging printing types on a rotary printing wheel against a printing medium through a printing ribbon.

In this type of printing apparatus, the area of contact of printing types with a printing medium through a printing ribbon differs according to the kind of characters to be printed, so that where the type urging strength is set at a constant value, the print density will not be uniform. To avoid this inconvenience, it is necessary to let the type urging strength differ according to the characters to be printed.

SUMMARY OF THE INVENTION

It is the object of the present invention to provide a printing apparatus superior to conventional ones, which printing apparatus is capable of affording a nearly constant print density even for different printing characters.

According to the present invention, there is provided a printing apparatus for printing characters by moving plural printing types formed on the circumference of a rotary printing wheel to the printing position successively in accordance with character data and urging the types successively against a printing medium through a printing ribbon, the printing apparatus including a first memory which stores both first and second data in the same address with respect to each of the printing types, the first data comprising character data which correspond respectively to the printing types and which are divided into plural groups, the character data being different from one another in each of the groups and including data common to the groups, the second data being indicative of the urging strength of each printing type when urged against the printing medium; a second memory which stores data for distinguishing between the groups of the character data in corresponding relation to each of the printing types; means for preparing positional data of each of the printing types to which the character data correspond from each data in predetermined addresses of the first and second memories corresponding to the character data; means for driving the rotary printing wheel in accordance with the positional data so that the printing type of the character to be printed reaches the printing position; and printing type urging means for urging the printing type of the character to be printed against the printing medium through the printing ribbon at an urging force based on the second data indicative of the urging strength stored in the first memory.

BRIEF DESCRIPTION OF THE DRAWINGS

The above and other objects, features and advantages of the present invention will become more apparent from a reading of the following description of a preferred embodiment of the invention taken in connection with the accompanying drawings, in which:

FIG. 2 is a view showing character impact spoke number data in ROM;

FIG. 3 is a view showing spoke area data in ROM;

FIG. 4 is a view showing how to decide impact data; and

DETAILED DESCRIPTION OF A PREFERRED EMBODIMENT

A construction according to an embodiment of the present invention will be described hereinunder with reference to FIGS. 1 through 4.

Figure 1:
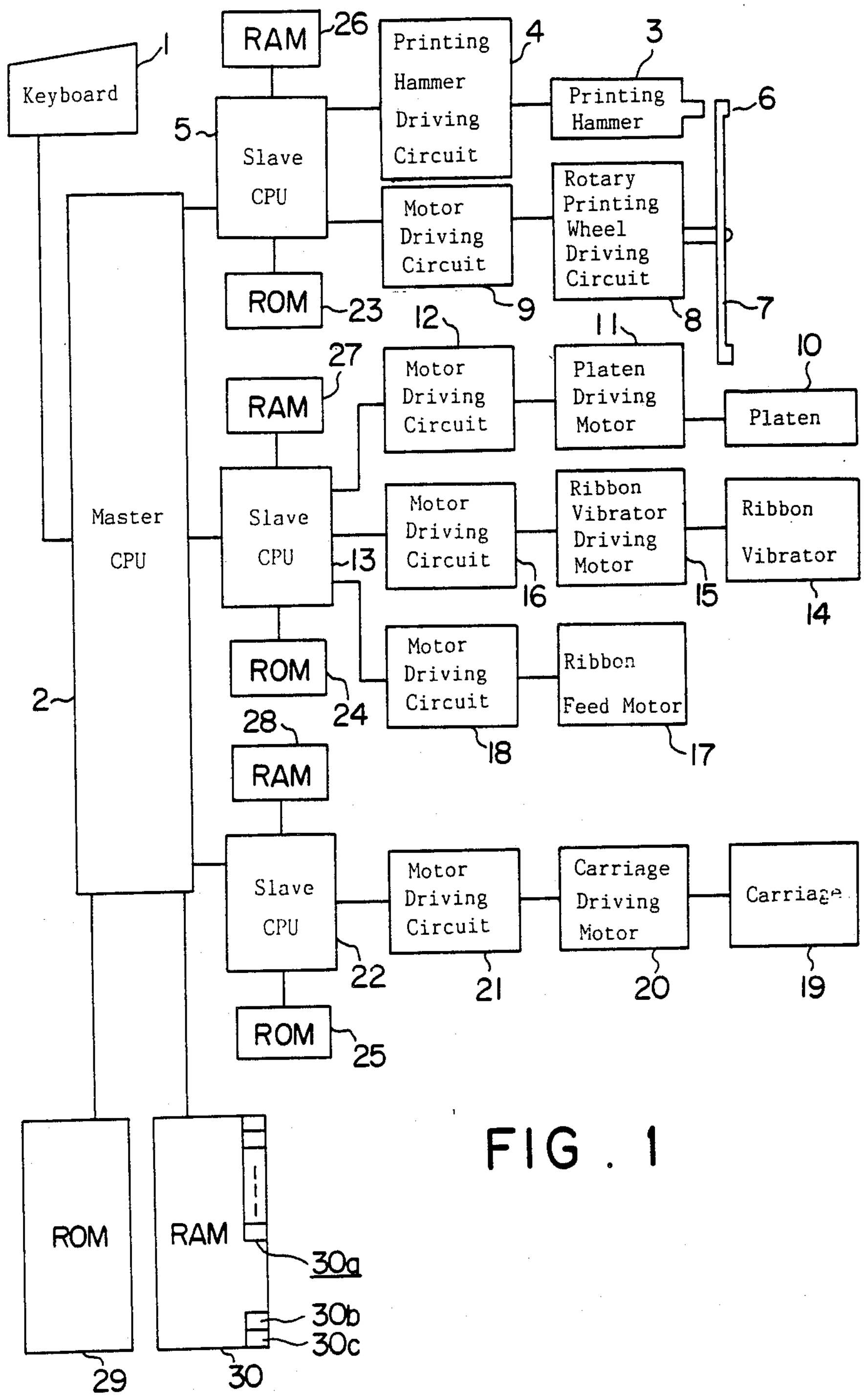
FIG. 1 is a block diagram showing an embodiment of the present invention.

Referring first to FIG. 1, a keyboard 1 carrying thereon character keys and other keys, a print density adjusting manual switch, etc. is connected to an 8-bit master central processing unit (hereinafter referred to as the "master CPU") 2, and a printing hammer 3 is connected to an 8-bit slave CPU 5 through a printing hammer driving circuit 4. A rotary printing wheel 7 formed on its circumference with 96 kinds of printing types 6, including character types and other types, is connected to a rotary printing wheel driving motor 8, which in turn is connected to the slave CPU 5 through a motor driving circuit 9. A platen 10 on which is loaded a printing paper is driven by a platen driving motor 11, which in turn is connected to an 8-bit slave CPU 13 through a motor driving circuit 12. Further, a ribbon vibrator 14 is driven by a ribbon vibrator driving motor 15, which in turn is connected to the slave CPU 13 through a motor driving circuit 16. A ribbon feed motor 17 is connected to an 8-bit slave CPU 13 through a motor driving circuit 18. To the slave CPU's 5, 13 and 22 are connected ROM's (read-only memories) 23, 24 and 25, respectively, in which are stored processing programs, and also connected are working RAM's (random access memories) 26, 27 and 28, respectively. An ROM 29, which is connected to the master CPU 2, stores processing programs, the character impact spoke number data shown in FIG. 2, the spoke area data shown in FIG. 3 and impact data Ics shown in FIG. 4.

The character impact spoke number data shown in FIG. 2 are each composed of an 8-bit unit of which two bits are character impact data Ic and six bits are spoke number data. The said data of FIG. 2 are 96-byte data corresponding to the number of the printing types formed on the rotary printing wheel 7, namely, 96 characters. Since the character impact data Ic consists two bits, it is possible to represent the impact strength by the printing hammer 3 in four stages from 0 to 3 according to the printing areas of the types 6. The spoke number data takes 48 values from 0 to 47, using two addresses for the same value. The value of the spoke number data is determined according to in which position counted from a reference position type 6 is located the type to which the address of that data corresponds. In this embodiment, the types 6 on the rotary printing wheel 7 are classified into a group of types located in left-hand semicircle and a group of types located in a right-hand semicircle with respect to a predetermined reference type 6. The spoke number data of the reference type 6 is set at 0, from where the spoke number data is cumulated successively one by one in a counterclockwise direction, and the spoke number data of the last type 6 in the left-hand semicircle is set at 47. Then, the spoke number data of the next type 6 on the left side of the last type 6 in the left-hand semicircle, namely, the spoke number data of the first type 6 in the right-hand semicircle is set at 0, and the spoke number data is cumulated successively one by one in the same manner as in the case of the left-hand semicircle until reaching 47 which corresponds to the spoke number data of the last type in the right-hand semicircle. Thus, for each of the ninety-six types 6 there is constituted an 8-bit character impact spoke number data consisting of 6-bit spoke number data and 2-bit character impact data Ic. Since the character impact/spoke number data are arranged in the ROM 29 in the order of codes of key-input signals such as character keys, etc., provided by the keyboard 1, it is possible to deal with character and other key inputs in a simple manner.

The spoke area table of FIG. 3 is composed of 12 bytes, namely, 96 bits corresponding to the total number of the printing types 6 formed on the rotary printing wheel 7, each bit being in a 1:1 correspondence to each type 6. Where each corresponding type 6 is positioned in the left-hand semicircle of the rotary printing wheel 7, the spoke area data is set at 0, whereas if it is positioned in the right-hand semicircle, the spoke area data is set at 1. Those spoke area data are arranged in the ROM 29 in correspondence to the code of key-input signals such as character keys, etc.

The impact data Ics shown in FIG. 4 are determined by combinations of both character impact data Ic of the character impact/spoke number data shown in FIG. 2 which are stored in the ROM 29 and manual data Is which are input through the manual switch mounted on the keyboard 1 for adjusting the print density in three stages of H,M and L. More specifically, for each of the 0 to 3 of the character impact data Ic are provided three 5-bit data corresponding respectively to H, M and L of the manual impact data Is, which are stored in the ROM 29, and thus a total of 12 data are provided.

The RAM 30, which is for working the processings, serves, for example, as a key buffer 30*a* as a temporary storage of key-input data from the keyboard 1, as an impact buffer 30*b* as a temporary storage of data on the urging strength of the printing hammer 3 against the type 6, and as a position buffer 30*c* as a temporary storage of data on the position of the type 6 corresponding to the character to be printed. The RAM 30 is connected to the master CPU 2.

The operation of the printing apparatus having the above-described construction will be described below with reference to FIGS. 1 through 6.

Figure 5:
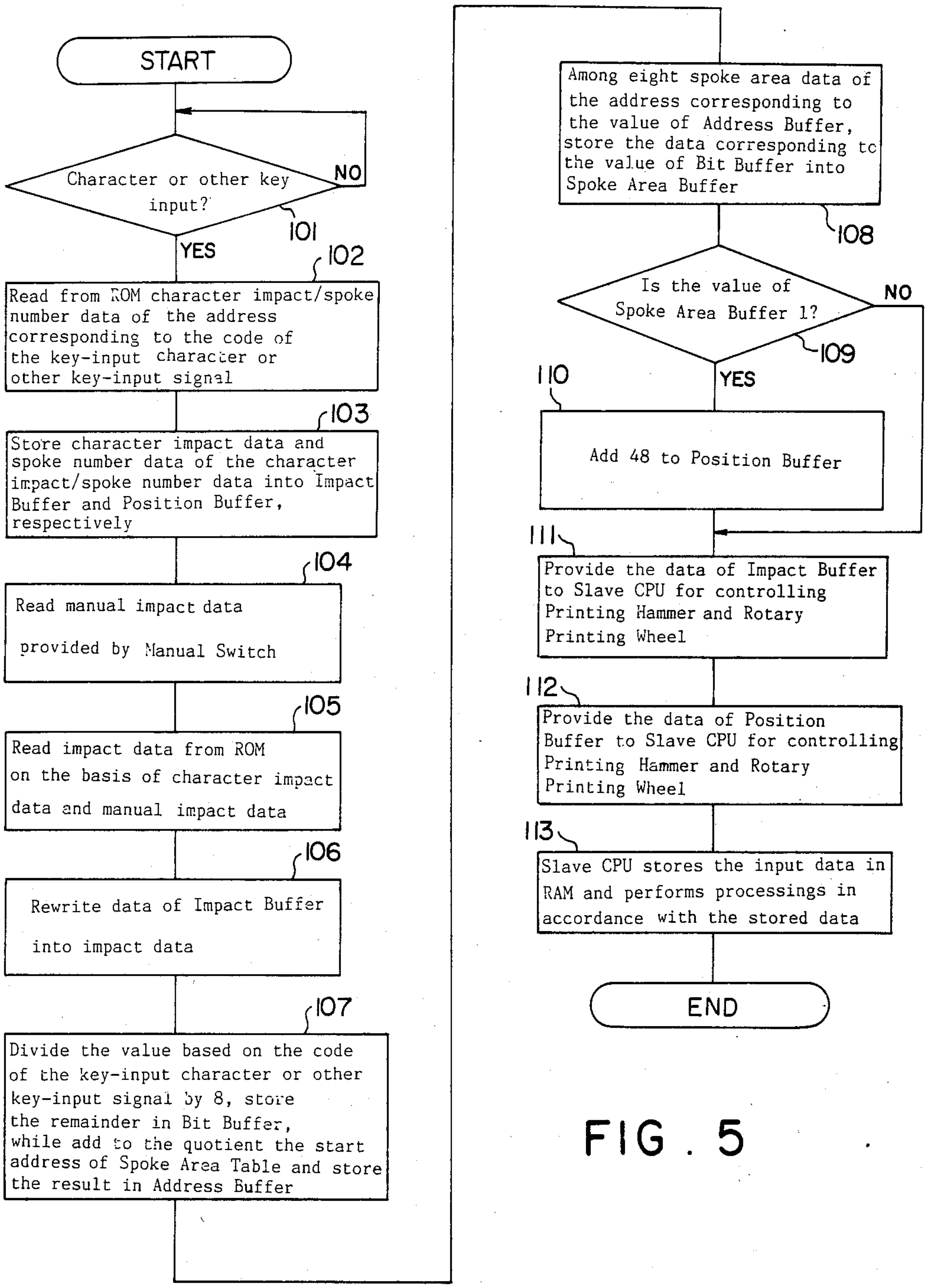
FIG. 5 and 6 are flowcharts.

Referring to FIG. 5, first in step 101, a decision is made as to whether a key-input signal such as a character key- or other key-input signal has been provided from the keyboard 1. If the decision is negative, the master CPU 2 stands by. Then, upon receipt of such key-input signal, the master CPU 2 advances to step 102 and reads out from the ROM 29 the 8-bit character impact/spoke number data stored in the address corresponding to the code of the key-input character or other key-input signal. The master CPU 2 then advances to step 103 and stores in the impact buffer 30*b* the 2-bit character impact data Ic of the 8-bit character impact/-spoke number data read out in step 102, and stores the 6-bit spoke number data in the position buffer 30*c*, then advances to step 104 and reads manual impact data Is provided from the manual switch mounted on the keyboard 1 for selecting the print density in three stages of H, M and L, then advances to step 105 and reads out impact data Ics from the ROM 29 in accordance with the combination of the character impact data Ic stored in the impact buffer 30*b* in step 103 and the manual impact data is read in step 104, then advances to step 106 and rewrites the value of the impact buffer 30*b* into the impact data Ics read out in step 105. The master CPU 2 then advances to step 107 and divides the value based on the code of the input character or other signal by 8, stores the remainder in a bit buffer, adds to the quotient and start address of the spoke area table of FIG. 3 stored in the ROM 29 and stores the result in an address buffer, then advances to step 108 and reads out from the ROM 29 eight spoke area data of the address corresponding to the value of the address buffer and stores in a spoke area buffer in the RAM 30 the spoke area data of the bit corresponding to the value of the bit buffer out of the aforesaid eight spoke area data, the value of the bit buffer taking any one of eight remainders (0, 1, 2, 3, 4, 5, 6, 7). In this embodiment, the minimum value of the eight remainders, i.e. 0, is made corresponding to the least significant bit (LSB) of the eight bits and higher digits are made successively corresponding to larger remainders one by one, and the maximum value of the remainders, i.e. 7, is made corresponding to the most significant bit (MSB) of the eight bits. The master CPU 2 then advances to step 109 and decides whether the value of the spoke area buffer is 1 or not. If the spoke area data is 1, that is, the printing type 6 corresponding to the key-input character or other key-input signal is located in the right-hand semicircle of the rotary printing wheel 7, the master CPU 2 advances to the next step 110 and adds 48 to the value of the position buffer 30*c*, then advances to step 111. On the other hand, if the spoke area data is 0 in step 109, that is, the printing type 6 corresponding to the key-input character or other key-input signal is located in the left-hand semicircle of the rotary printing wheel 7, the master CPU 2 advances to step 111 immediately and supplies the data of the impact buffer 30*b* to the slave CPU 5 which is for controlling the printing hammer 3 and the rotary printing wheel 7, then advances to step 112 and supplies the data of the position buffer 30*c* to the slave CPU 5, and then advances to step 113, in which the slave CPU 5 performs processings in accordance with the input data.

The following will describe the operation of the slave CPU 5 which is for controlling the printing hammer 3 and the rotary printing wheel 7.

Figure 6:
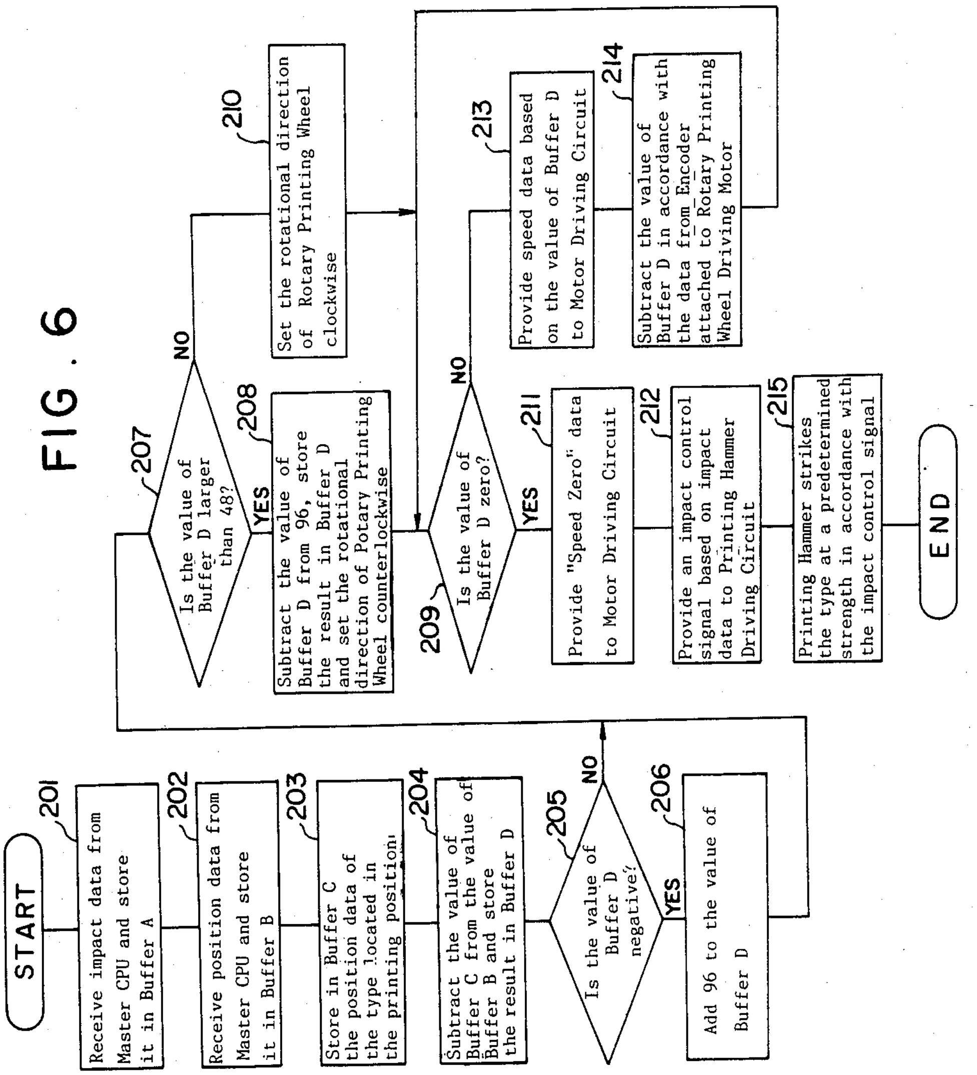

Referring to FIG. 6, first in step 201, the slave CPU 5 receives the impact data Ics from the master CPU 2 and stores it in a buffer A located within the RAM 26. Then, the slave CPU 5 advances to step 202 and receives from the master CPU 2 the foregoing position data, namely, the data indicating the position of the type 6 corresponding to the character to be next printed and stores it in a buffer B located within the RAM 26, then advances to step 203 and stores in a buffer C located also within the RAM 26 the position data of the type 6 on the rotary printing wheel 7 located in the printing position, namely, in the position to be struck by the printing hammer 3, then advances to step 204 and subtracts the value of the buffer C from the value of the buffer B and stores the result in a buffer D located within the RAM 26. The slave CPU 5 then advances to step 205 and decided whether the value of the buffer D is negative or not, and, if it is negative, advances to step 206 and adds 96 to the value of the buffer D, then advances to step 207, but when the value of the buffer D is not negative in step 205, it advances to step 207 directly. In step 207, the slave CPU 5 decides whether the value of the buffer D is larger than 48 or not, and, if it is larger than 48, advances to step 208 and substracts the value of the buffer D from 96, stores the result in the buffer D and sets the rotational direction of the rotary printing wheel 7 counterclockwise when viewed from the obverse, namely, the side where the types 6 are formed, then advances to step 209. On the other hand, when the value of the buffer D is not larger than 48 in step 207, the slave CPU 5 advances to step 210 and sets the rotational direction of the rotary printing wheel 7 clockwise when viewed from the obverse, then advances to step 209. In step 209, the slave CPU 5 decides whether the value of the buffer D is zero or not, and in the case of zero, advances to step 211 and sets the rotational speed of the rotary printing wheel 7 to zero, that is, outputs "Stop" data to the motor driving circuit 9 for the rotary printing wheel driving motor 8, then advances to step 212. On the other hand, when the value of the buffer D is not zero in step 209, the slave CPU 5 advances to step 213 and outputs data on the rotational speed which corresponds to the amount of rotation based on the value of the buffer D to the motor driving circuit 9. Then, the slave CPU 5 advances to step 214 and subtracts from the value of the buffer D a value corresponding to the rotated amount on the basis of data provided from a rotational position detecting encoder attached to the rotary printing wheel driving motor 8, then returns to step 209. That is, the rotary printing wheel 7 is rotated by an amount of rotation corresponding to the value of the buffer D. Then, in step 212, the slave CPU 5 provides to the printing hammer driving circuit 4 an impact control signal based on the impact data Ics fed from the master CPU 2 which data is stored in the buffer A of RAM 26, then advances to step 215, in which step the ink hammer strikes the type 6 located in the printing position at a predetermined strength in accordance with the impact control signal.

Now, the relation between the operation of the printing hammer 3 and rotary printing wheel 7 and the operation of the platen 10, ribbon vibrator 14 and carriage 19 will be described below.

The slave CPU 5 provided a motor driving signal to the motor driving circuit 9 to rotate the motor 8 to thereby bring the type 6 of the character to be printed into the printing position, and when the type 6 reaches the printing position and the ink ribbon is driven in a normal condition, the slave CPU 5 provides a driving pulse based on the impact data Ics to the printing hammer driving circuit 4 to drive the printing hammer 3 and realizes a desired printing pressure. After providing a printing control signal to the slave CPU 5, the master CPU 2 provides printing control signals successively to the slave CPU's 13 and 22. In accordance with the printing control signal, the slave CPU 13 provides a motor driving signal to the motor driving circuit 18 for driving the ribbon feed motor 17 and a motor driving signal to the motor driving circuit 16 for driving the ribbon vibrator driving motor 15. When the ribbon driving operation is over, the slave CPU 13 provides a ribbon drive End signal to the slave CPU 5, which in turn drives the printing hammer 3 in the manner described above. When the desired character is printed on the printing paper through the type 6 by means of the printing hammer 3, the slave CPU 5 provides a hammer drive End signal to the slave CPU 22, which in turn provides a carriage motor driving signal to the motor driving circuit 21 for driving the carriage motor 20 in accordance with the printing control signal to thereby move the carriage 19 by a predetermined distance. Then, the slave CPU 22 provides to the master CPU 2 a Ready signal indicating completion of the printing operation, namely, a state ready for printing. After outputting the printing control signals to the slave CPU's 5, 13 and 22 and until input of the Ready signal, the master CPU 2 performs a key search control for the keys on the keyboard 1, and at every key input CPU 2 stores it in the key buffer 30*a* and at every input of the Ready signal the master CPU 2 provides a printing control signal which corresponds to the previously stored input key, to each of the slave CPU's 5, 13 and 22 and in this way it performs printing operations successively.

The paper feed operation will now be described. When the Paper Feed key on the keyboard 1 is operated, the master CPU 2 provides to the slave CPU 13 a printing control signal indicative of the number of the step of the platen driving motor 11 equal to the amount of rotation corresponding to one line of the platen 10, whereupon the slave CPU 13 provides a driving pulse signal equal to the number of the step to the motor driving circuit 12. When the Carriage Return key on the keyboard 1 is operated, the master CPU 2 provided to the slave CPU 22 a printing control signal indicative of the moving direction and the number of the step of the carriage driving motor 20 corresponding to the distance between the present position of the carriage and the left-hand marginal position. Both slave CPU's 13 and 22 provide the Ready signal to the master CPU 2 after completion of the respective driving operations.

Although in the above embodiment the manual switch is used for adjusting the urging force against the printing types, it may be omitted and instead the urging force against the types may be decided by using only the character impact data Ic corresponding to each of the type 6. In this case, the steps 104 and 106 in FIG. 5 are omitted.

According to the printing apparatus of the present invention, as set forth hereinabove, the urging force against the printing type of the character or the like to be printed can be varied in four stages according to the area of the type which contacts the printing medium through the printing ribbon. By this fourstage adjustment of the urging force, a uniform print density is assured to a satisfactory extent in practical use with respect to all of the printing types.

What is claimed is:

1. A printing apparatus for printing characters by moving a plurality of printing types formed on the circumference of a rotary printing wheel to the printing position successively in accordance with character data and urging the printing types successively against a printing medium through a printing ribbon, said printing apparatus including:
   - a first memory which stores both first and second data in the same address with respect to each of said printing types, said first data comprising character data which correspond respectively to said printing types and which are divided into plural groups, said character data being different from one another in each of said groups and including data common to said groups, said second data being indicative of the urging strength of each said printing type when urged against said printing medium, said first memory stores eight bits as one unit; of which two bits represents character impact data and six bits represent position data;
   - a second memory which stores data for distinguishing between said group of said character data in corresponding relation to each of said printing types;
   - means for preparing positional data of each of said printing types to which said character data correspond with each data in predetermined addresses of said first and second memories corresponding to said character data;

means for driving said rotary printing wheel in accordance with said positional data so that the printing type of the character to be printed reaches the printing position; and means for urging the printing type of the character to be printed against said printing medium through said printing ribbon at an urging force based on said second data indicative of the urging strength stored in said first memory.

2. A printing apparatus as defined in claim 1, wherein said position data are divided into first and second groups, said first group being addressed from a predetermined printing type as a first reference type out of the printing types formed on said rotary printing wheel toward a predetermined direction with successive increases by a predetermined amount, said second group being addressed in the same manner as said first group from the type as a second reference type next to the maximum address of said first group up to one type this side of said first reference type.

3. A printing apparatus as defined in claim 2, wherein said second memory stores data for distinguishing whether said character data belong to said first group or said second group, said second memory storing said distinguishing data for each said character data.

4. A printing apparatus as defined in claim 3, wherein the position on said rotary printing wheel of each of the printing types belonging to said first group is indicated by said position data stored in said first memory, and the position on said rotary printing wheel of each of the printing types belonging to said second group is indicated by a value obtained by adding a value—which is obtained by multiplying said predetermined amount by the number of the types belonging to said first group—to said position data stored in said first memory.

* * * * *